(12) United States Patent
Wang et al.

(10) Patent No.: US 11,422,838 B2
(45) Date of Patent: *Aug. 23, 2022

(54) INCREMENTAL REPLICATION OF DATA BACKUP COPIES

(71) Applicant: Rubrik, Inc., Palo Alto, CA (US)

(72) Inventors: Zhicong Wang, San Francisco, CA (US); Benjamin Travis Meadowcroft, San Jose, CA (US); Biswaroop Palit, Mountain View, CA (US); Mudit Malpani, Mountain View, CA (US); Hardik Vohra, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 424 days.

This patent is subject to a terminal disclaimer.

(21) Appl. No.: 16/511,897

(22) Filed: Jul. 15, 2019

(65) Prior Publication Data
US 2020/0019424 A1    Jan. 16, 2020

Related U.S. Application Data

(60) Provisional application No. 62/698,772, filed on Jul. 16, 2018.

(51) Int. Cl.
*G06F 9/455* (2018.01)
*G06F 11/14* (2006.01)

(52) U.S. Cl.
CPC ...... *G06F 9/45533* (2013.01); *G06F 11/1448* (2013.01); *G06F 11/1458* (2013.01); *G06F 2201/815* (2013.01); *G06F 2201/84* (2013.01)

(58) Field of Classification Search
CPC ............. G06F 9/45533; G06F 11/1448; G06F 11/1458; G06F 2201/815; G06F 2201/84
See application file for complete search history.

(56) References Cited

U.S. PATENT DOCUMENTS

2016/0124764 A1*  5/2016  Nithrakashyap .... G06F 11/1446
                                                        718/1

OTHER PUBLICATIONS

Kargatzis et al. (Virtual Machine Migration in heterogenouse Clouds: From OpenStack to VMWare, IEEE, 38th Sarnoff Symposium, 2017 (Year: 2017).*
Kotrakona ("Running a website on Amazon EC2", Nov. 11, 2010, academia.edu). (Year: 2010).*

* cited by examiner

*Primary Examiner* — Wissam Rashid
(74) *Attorney, Agent, or Firm* — Holland & Hart LLP

(57) ABSTRACT

An example method of managing and storing data includes pulling and saving a first snapshot of a first state of a target machine running on a cloud service and creating a first virtual machine (VM) package associated with the first snapshot. The first VM package sufficient to instantiate a VM emulating the target machine with the first state on an on-premise destination VM platform. The method includes pulling and saving a second snapshot of a second state of the target machine, wherein the second state occurs after the first state. A second VM package is created and associated with the second snapshot, the second VM package sufficient to instantiate the VM emulating the target machine with the second state on the destination VM platform. The second VM package is created by updating the first VM package according to differences between the first snapshot and the second snapshot.

20 Claims, 7 Drawing Sheets

INCREMENTAL REPLICATION OF DATA BACKUP COPIES

CLAIM OF PRIORITY

This patent application claims the benefit of priority, under 35 U.S.C. Section 119(e), to Wang, U.S. Provisional Patent Application Ser. No. 62/698,772, entitled "Incremental Replication of Data Backup Copies," filed on Jul. 16, 2018, which is hereby incorporated by reference herein in its entirety.

TECHNICAL FIELD

The present invention generally relates to managing and storing data, for example for disaster recovery purposes.

BACKGROUND

The amount and type of data that is collected, analyzed and stored is increasing rapidly over time. The compute infrastructure used to handle this data is also becoming more complex, with more processing power and more portability. As a result, data management and storage are becoming increasingly important. One aspect of this is reliable data backup and storage, and fast data recovery in cases of failure and disaster. Another aspect is data portability across locations and platforms.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically includes backup and retrieval of the virtual machines, in addition to just the application data. However, various different platforms are offered for virtualization. While users may desire to have their applications and data be machine-agnostic, it typically is not easy to port applications and data between different platforms.

SUMMARY

In some embodiments, a system comprises processors; and a memory storing machine-readable instructions that, when executed by at least one processor among the processors, cause the system to perform operations comprising, at least: pulling and saving a first snapshot of a first state of a target machine running on a cloud service; creating a first virtual machine (VM) package associated with the first snapshot, the first VM package sufficient to instantiate a VM emulating the target machine with the first state on an on-premise destination VM platform; pulling and saving a second snapshot of a second state of the target machine, wherein the second state occurs after the first state; and creating a second VM package associated with the second snapshot, the second VM package sufficient to instantiate the VM emulating the target machine with the second state on the destination VM platform, wherein the second VM package is created by updating the first VM package according to differences between the first snapshot and the second snapshot.

In some examples, the snap shot is an Amazon Machine Image (AMI) and the cloud service is Amazon Web Services (AWS).

In some examples, the VM package is a Virtual Machine Disk (VMDK) and the on-premise destination VM platform is a VMware platform.

In some examples, first and second VM packages are created for at least two different destination VM platforms.

In some examples, the target machine is a physical machine.

In some examples, the target machine is a virtual machine.

In some examples, pulling and saving the snapshots is performed as part of a backup service for a compute infrastructure.

DESCRIPTION OF THE DRAWINGS

Some embodiments are illustrated by way of example and not limitation in the figures of the accompanying drawings.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
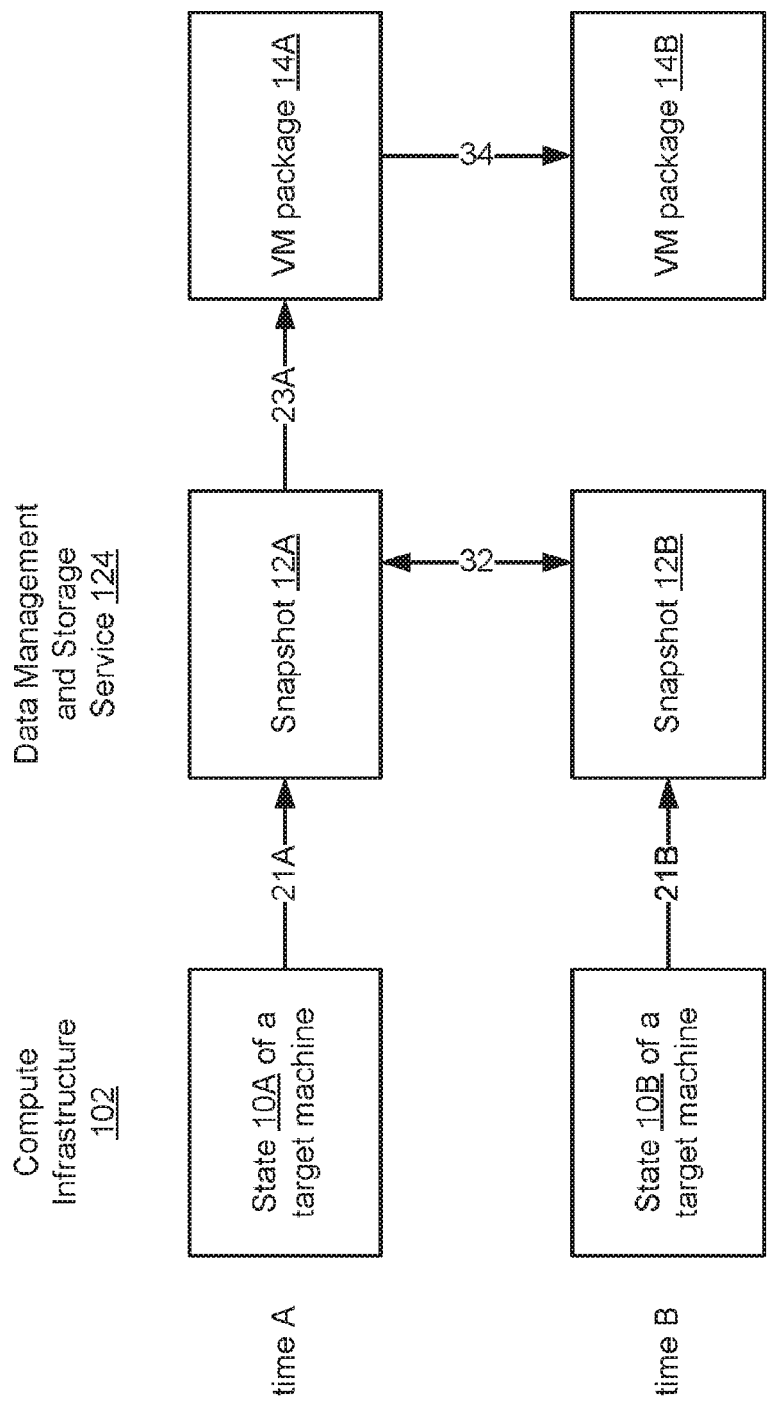
FIG. 1 is a block diagram illustrating the incremental creation of data backup copies, according to an example embodiment.

FIG. 1 is a block diagram illustrating the incremental creation of data backup copies, according to one embodiment. In this example, a compute infrastructure 102 includes multiple virtual machines (VMs) that run on a cloud service. The VMs are managed by a data management and storage (DMS) service 112. One service provided is the creation of data backup copies such as VM packages that are sufficient to allow instantiation of VMs emulating the target machines on VM platforms.

In FIG. 1, consider a particular machine in the compute infrastructure 102. At time point A, this target machine has a state 10A. The DMS service 112 takes 21A a snapshot 12A that captures the state 10A of the target machine. The target machine may be a virtual machine (VM) 104 or a physical machine (PM) 108 in a compute infrastructure 102 as further described below with respect to FIGS. 2A-2C. If the target machine is a VM that runs natively in a cloud service, the DMS service 112 invokes an interface provided by the cloud service to create the snapshot 12A. The snapshot 12A may be stored in the cloud service. The DMS service 112 also creates 23A a VM package 14A that is associated with the snapshot 12A, although this may occur at a later time. In one approach, it occurs within a certain time period after the corresponding snapshot has been saved.

If VM package 14A is the first package for the target machine, it may be created through a conversion process that converts the snapshot 12A to the VM package 14A. The snapshot is sufficient to instantiate a VM emulating the target machine with state 10A on a VM platform. The snapshot 12A may be a periodic backup of the target machine saved in the cloud service. The VM package 14A is sufficient to instantiate a VM emulating the target machine with state 10A on a destination VM platform. The destination VM platform can be provided by an on-premise IT infrastructure such as a physical cluster or a virtual cluster. The destination VM platform is different from the cloud service where the snapshot 12A can be used to instantiate a VM. For example, in some embodiments, the cloud service is AMAZON WEB SERVICES (AWS) and the VM package 14A is an AMAZON MACHINE IMAGE (AMI); and the destination VM platform is VMWARE and the VM package 14A is a VIRTUAL MACHINE DISK (VMDK). In other embodiments, the VM platform may be AZURE and the VM package 14A may be a VIRTUAL HARD DISK (VHD). As further described below with respect to FIGS. 2A-2C, the VM package 14A may be stored on the on-premise cluster such as a DMS cluster 112 or a data storage service 124.

More generally, a VM package is a virtual machine image that provides the information required to launch a VM instance in a VM platform. For example, a VM package typically includes a template for the root volume for the VM that includes an operating system (e.g., Linux, Unix, or Windows) and any additional software (e.g., application servers, or applications) required to deliver a service. The VM package typically is a software stack that is ready to run on the VM platform. The VM platform is a host environment with computer software, firmware, hardware, or combinations (e.g., a hypervisor) that host VMs.

At a later time point B, the DMS service 124 takes 21B a second snapshot 12B to capture the state 10B of the target machine at that time. The corresponding VM package 14B could be created from snapshot 12B using a conversion process, but often the conversion process may take a long time and/or require significant compute resources. Instead, the VM package 14B is created as follows. The DMS service 124 determines 32 the differences between the snapshots 12A and 12B. The VM package 14A is then updated 34 according to these differences, thus creating the VM package 14B. The VM package 14B is sufficient to instantiate a VM on the destination platform that emulates the target machine with state 10B. As one example, if the snapshots 12A and 12B are stored as AMIs, the DMS service 124 compares the snapshots 12A and 12B and stores the difference between the snapshots 12A and 12B as a patch file. A patch file is a text file that consists of a list of differences. The DMS service 124 further converts the patch file into a VMDK (Virtual Machine Disk). This VMDK that includes the difference between the states at times A and B inherits the same managed object identifier (MOID) as the original VM package 14A. The DMS service 124 updates the VM package 14A with the VMDK that includes the difference.

FIG. 1 shows the creation of VM packages 14 for a single VM platform. However, the DMS cluster 112 preferably can create VM packages for multiple VM platforms. Preferably, the snapshots 12 are agnostic to the VM platform. Accordingly, the DMS cluster 112 provides enhanced mobility because the state of the target machine can be instantiated on different VM platforms. The snapshots 12 may or may not be VM packages themselves.

Figure 2A:
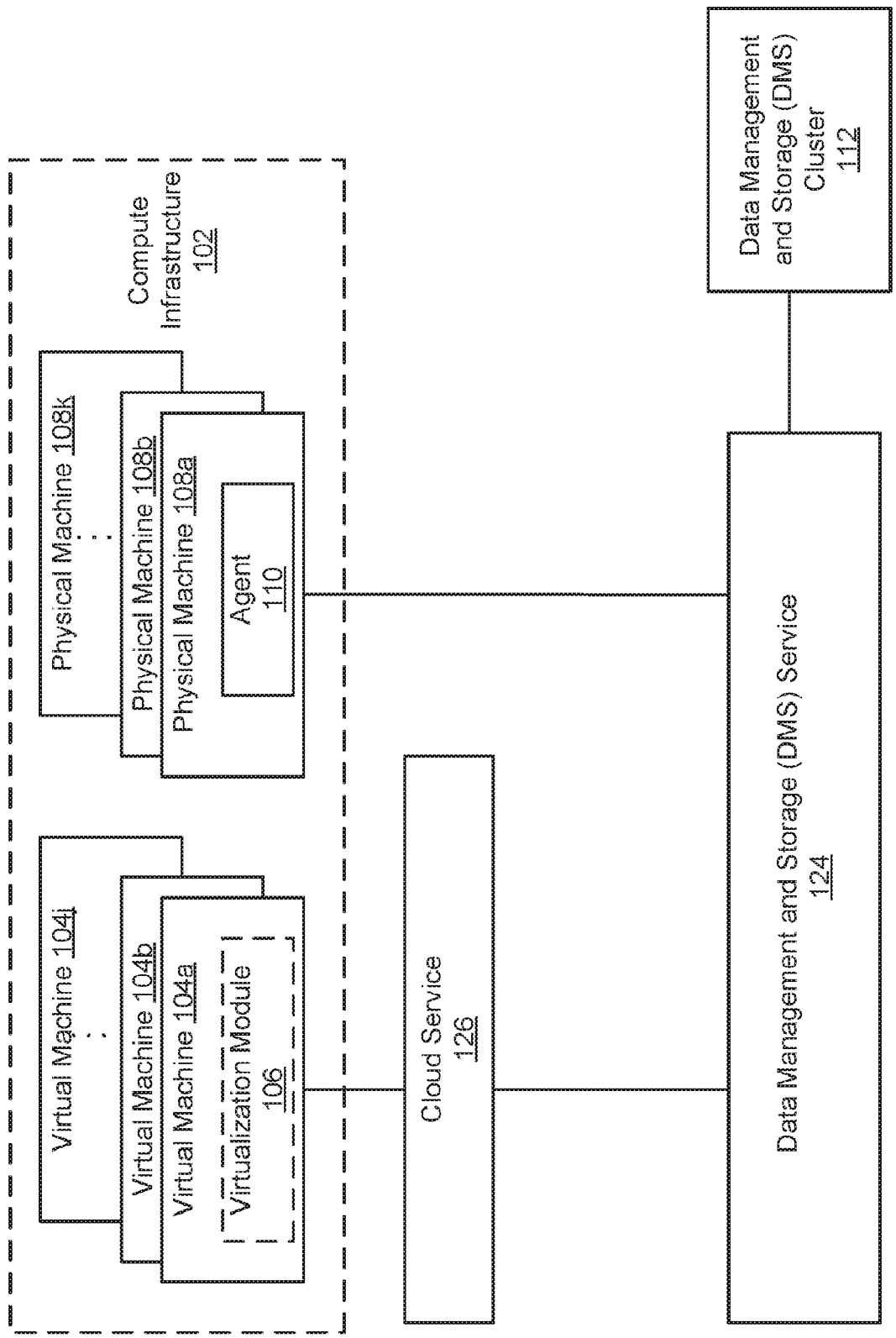
FIG. 2A is a block diagram illustrating a system for managing and storing data, according to an example embodiment.

FIG. 2A is a block diagram illustrating a system for managing and storing data, according to one embodiment. The system includes a data management and storage (DMS) service 124 and a DMS cluster 112. The DMS service 124 provides data management and storage services to a compute infrastructure 102, which may be used by an enterprise such as a corporation, university, or government agency. Many different types of compute infrastructures 102 are possible. Some examples include serving web pages, implementing e-commerce services and marketplaces, and providing compute resources for an enterprise's internal use. The compute infrastructure 102 can include production environments, in addition to development or other environments.

In this example, the compute infrastructure 102 includes multiple virtual machines (VMs) 104a-j and multiple physical machines (PMs) 108a-k. The VMs 104 can be implemented on different VM platforms. VMWARE, HYPER-V, MICROSOFT AZURE, GOOGLE CLOUD PLATFORM (GCP), NUTANIX ACROPOLIS HYPERVISOR (AHV), KERNEL-BASED VIRTUAL MACHINE (KVM), and XEN are some examples. The VM platforms can be provided by different cloud services, such as AWS (AMAZON WEB SERVICES), GOOGLE CLOUD PLATFORM (GCP), MICROSOFT AZURE, IBM CLOUD, etc. The physical machines 108a-n can also use different operating systems running various applications. For example, a physical machine 108a uses MICROSOFT WINDOWS running MICROSOFT SQL or ORACLE databases, or uses LINUX running a web server.

The DMS service 124 manages and stores data for the compute infrastructure 102. This can include the states of machines 104, 108, configuration settings of machines 104, 108, network configuration between machines 104, 108, and data stored on machines 104, 108. Example DMS services includes backup, recovery, replication, archival, and analytics services. Additional examples include the creation of VM packages, as described in FIG. 1.

The DMS service 124 interfaces with the cloud service 126 to create VM packages for instantiating VMs, as described in FIG. 1. The snapshots 12 of FIG. 1 preferably are stored in the cloud service 126. The DMS service 124 creates the VM packages. The original snapshots are AMI (AMAZON MACHINE IMAGES) used to instantiate VMs on AWS (AMAZON WEB SERVICES) and the resulting VM packages are stored in VMDK (Virtual Machine Disk) format.

The first snapshot (e.g., AMI) for a target machine is created as follows. VMs are running on the cloud service 126, for example, as an instance (e.g., an EC2 instance). Storage volumes (e.g., an EBS volume) are created on the cloud service 126 for storage of the snapshots. The DMS service 124 may create the storage volume by interfacing with the cloud service 126. A storage volume has a storage capacity that is at least the size of the snapshot. The DMS service 124 interfaces with the cloud service 126 to take snapshots of the storage volumes. The snapshots are stored in the cloud service.

The DMS service 124 replicates the full snapshot into a VM package and stores the VM package in the DMS cluster (e.g., copies the raw disk image from AMI to the EBS volume). The DMS service 124 can read the full image of the snapshot from cloud service 126, convert the snapshot into a patch file, and convert the patch file into a VM package. The DMS service 124 may further create a storage volume in the DMS cluster 112, install one or more drivers into the storage volume, and/or make configuration changes to the storage volume such that the VM package can instantiate a VM in the destination VM platform. The DMS service 124 may take a snapshot of the DMS cluster 112 after it has been updated. This snapshot can be used to create later VM packages.

Once the first VM package has been created, later VM packages can be created using incremental conversions. Continuing the AMI to VMDK example above, once the second snapshot is taken, the DMS service 124 creates a second storage volume (e.g., EBS volume) based on the prior storage volume. The second storage volume is a copy of the earlier storage volume and then updated according to differences between the first and second snapshots.

The differences between the first and second snapshots are stored in a patch file. However, the incremental images can define the differences between snapshots based on different formats. As one example, the difference is defined based on a format that includes a disk offset and a change length (e.g., in bytes). As another example, it is defined based on a bitmap file representing the offset and length. As a further example, the differences are defined based on a format that includes changed sector numbers.

The services to be performed by the DMS service 124 are defined in an SLA (service level agreement). Each SLA includes a set of DMS policies (e.g., a backup policy, a replication policy, an archival policy, and a conversion policy) that define the services for that SLA. The backup policy defines a frequency and a time interval of backing up data for a target machine. The replication policy defines a frequency and a time interval of replicating data for a target machine. The archive policy defines a frequency and a time interval of archiving data for a target machine. The conversion policy defines a frequency and a time interval of converting data for a target machine.

The DMS cluster 112 also manages and stores data for the compute infrastructure 120. In the illustrated example, the DMS cluster 112 is implemented to manage and store data for the compute infrastructure 120 during disaster recovery. The DMS cluster 112 is implemented on premise of the enterprise that uses the compute infrastructure 102. In cases of disasters, the DMS cluster 112 can provide DMS services to the compute infrastructure 102 with minimal interruption. The DMS cluster 112 receives data (e.g., VM packages 14) to be stored from the DMS service 124. The DMS cluster 112 provides a VM platform (e.g., the destination VM platform). In addition, the DMS cluster 112 can instantiate VMs from the VM packages created by the cloud service 126.

Considering each of the other components shown in FIG. 1, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104.

A physical machine 108 is a physical computing system that allows execution of operating systems as well as software applications such as a database application or a web server. In the following example, an agent 110 is installed on the physical machines 108 to facilitate backups of the physical machines.

The components shown in FIG. 1 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 1 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

In various examples provided herein, the DMS cluster 112 providing the disaster recovery service is on-premise and the VMs are running on the cloud service 126. In other implementations, the disaster recovery service can be provided by a cloud service. The VMs can natively run on the same cloud service, on a different cloud service, or on the DMS cluster 112.

Figure 2B:
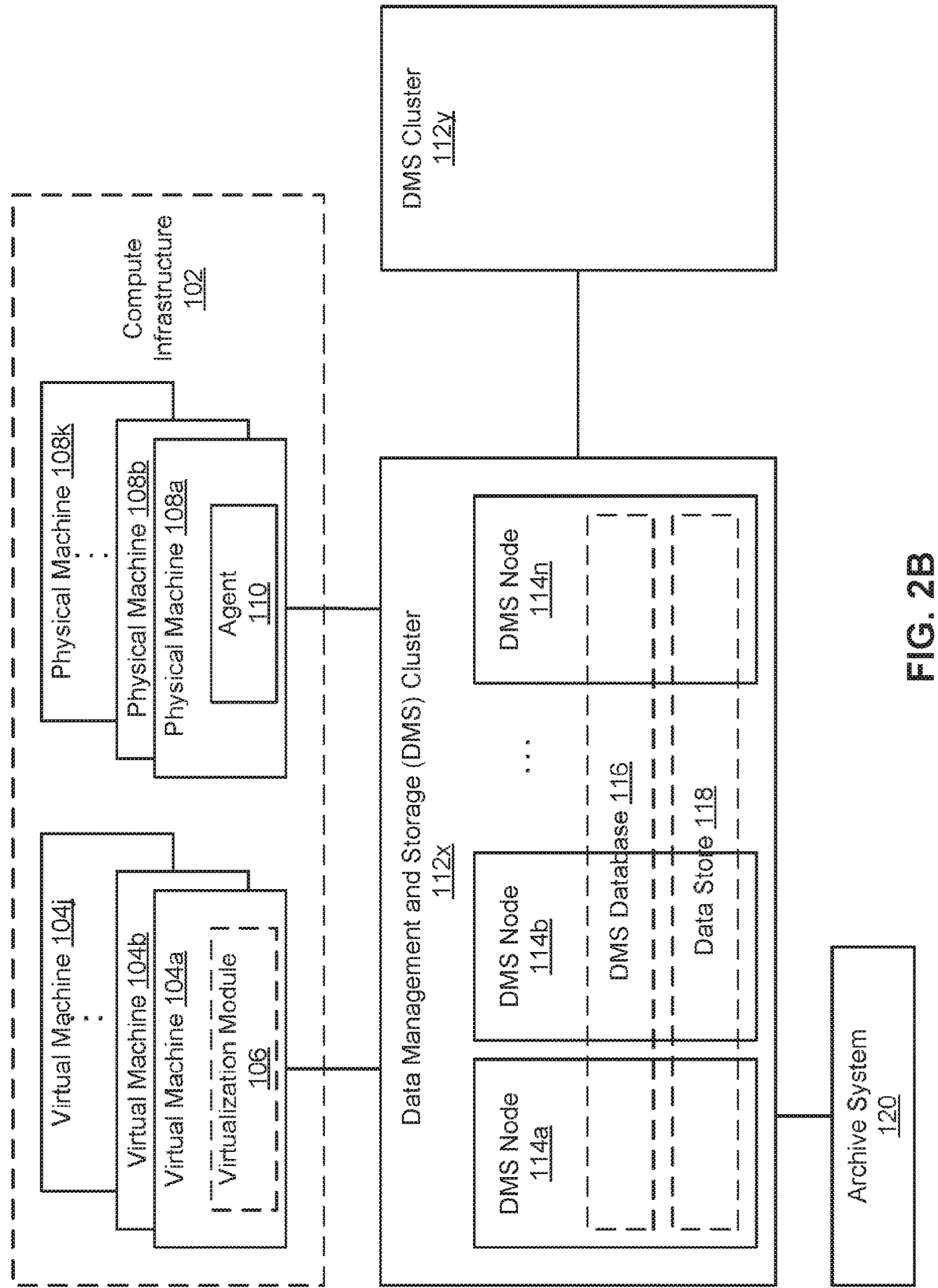
FIG. 2B is a block diagram illustrating a system for managing and storing data, according to an example embodiment.
Figure 2C:
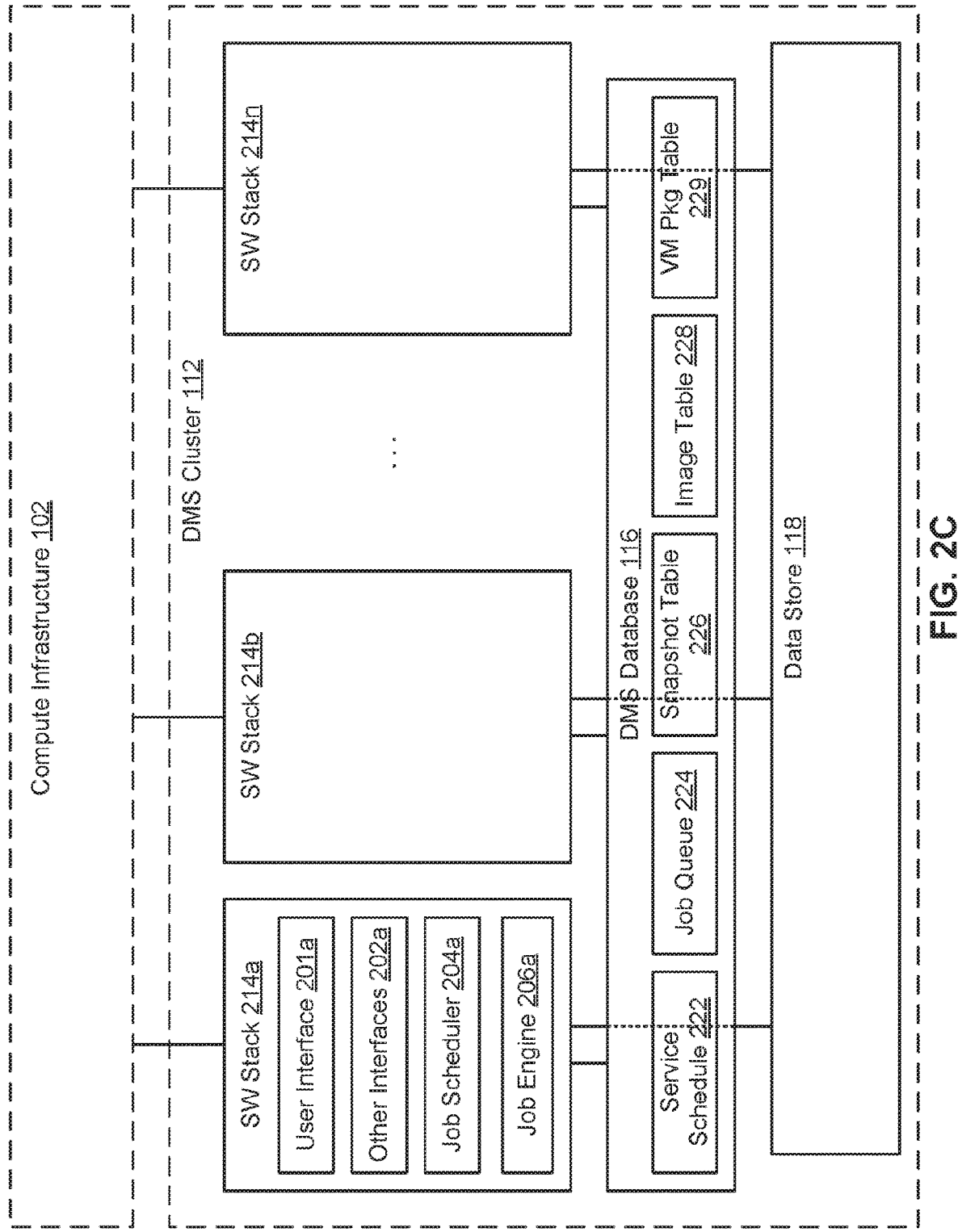
FIG. 2C is a logical block diagram illustrating an example data management and storage (DMS) cluster, according to an example embodiment.

Details of the DMS cluster 112 are further provided with respect to FIGS. 2B-2C.

FIG. 2B is a block diagram illustrating a system for managing and storing data, according to one embodiment. The system includes a data management and storage (DMS) cluster 112x, a secondary DMS cluster 112y, and an archive system 120. The DMS system provides data management and storage services to a compute infrastructure 102.

The DMS cluster 112 manages and stores data for the compute infrastructure 102. This can include the states of machines 104, 108, configuration settings of machines 104, 108, network configuration between machines 104, 108, and data stored on machines 104, 108. Example DMS services includes backup, recovery, replication, archival, and analytics services. The primary DMS cluster 112x enables near instant recovery of backup data. Derivative workloads (e.g., testing, development, and analytic workloads) may also use the DMS cluster 112x as a primary storage platform to read and/or modify past versions of data.

The DMS cluster 112 may also create data backup copies such as VM packages or snapshots described previously. The data backup copies may be stored in the primary DMS cluster 112x, in the data store 122, or in the secondary DMS cluster 112y. Restoration of VMs 104 can therefore be provided by different computing entities shown in FIG. 2B. That is, VMs with the saved states of the VMs 104 can be instantiated from the primary DMS cluster 112x, the data storage system 122, or the secondary DMS cluster 112y. If multiple VM platforms are available or desired, users have the flexibility to select where to instantiate VMs.

In this example, to provide redundancy, two DMS clusters 112x-y are used. From time to time, data stored on DMS cluster 112x is replicated to DMS cluster 112y. If DMS cluster 112x fails, the DMS cluster 112y can be used to provide DMS services to the compute infrastructure 102 with minimal interruption.

Archive system 120 archives data for the compute infrastructure 102. The archive system 120 may be a cloud service. The archive system 120 receives data to be archived from the DMS clusters 112. The archived storage typically is "cold storage," meaning that more time is required to retrieve data stored in archive system 120. In contrast, the DMS clusters 112 provide much faster backup recovery.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114a-n that collectively provide the DMS services, including managing and storing data. A DMS node 114 includes a software stack, processor and data storage. DMS nodes 114 can be implemented as physical machines or as virtual machines. The DMS nodes 114 are interconnected with each other, for example, via cable, fiber, backplane, and/or network switch. The end user does not interact separately with each DMS node 114 but interacts with the DMS nodes 114a-n collectively as one entity, namely, the DMS cluster 112.

The DMS nodes 114 are peers and preferably each DMS node 114 includes the same functionality. The DMS cluster 112 automatically configures the DMS nodes 114 as new nodes are added or existing nodes are dropped or fail. For example, the DMS cluster 112 automatically discovers new nodes. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, as will be described in more detail in FIG. 2. In the following examples, these are shown as tables but other data structures could also be used. The data store 118 contains the actual backup data from the compute infrastructure 102, for example snapshots of VMs or application files. Both the DMS database 116 and the data store 118 are distributed across the nodes 114, for example using Apache Cassandra. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 may have a similar structure. In one approach, data protection methods such as erasure coding is applied to encode data stored in the data store 118. Accordingly, if any DMS node 114 fails, the full DMS database 116 and/or data store 118 will still be available to the remaining DMS nodes and the full functionality of the DMS cluster 112 will still be available from the remaining DMS nodes. As a result, the DMS services can still be provided.

FIG. 2C is a logical block diagram illustrating an example DMS cluster 112, according to one embodiment. This logical view shows the software stack 214a-n for each of the DMS nodes 114a-n of FIG. 2B. Also shown are the DMS database 116 and data store 118, which are distributed across the DMS nodes 114a-n. Preferably, the software stack 214 for each DMS node 114 is the same. This stack 214a is shown only for node 114a in FIG. 2C. The stack 214a includes a user interface 201a, other interfaces 202a, job scheduler 204a and job engine 206a. This stack is replicated on each of the software stacks 214b-n for the other DMS nodes. The DMS database 116 includes the following data structures: a service schedule 222, a job queue 224, a snapshot table 226 and an image table 228. The DMS database 116 may further include a VM package data structure 229 which indexes the VM packages.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2C, this information is stored in the service schedule 222. The user interface 201 can also be used to allow the user to run diagnostics, generate reports or calculate analytics.

The software stack 214 also includes other interfaces 202. For example, there is an interface 202 to the compute infrastructure 102, through which the DMS nodes 114 may make requests to the virtualization module 106 and/or the agent 110. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112y and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), create VM packages, archive, etc. Some of these jobs are determined according to the service schedule 222. For example, if a certain machine is to be backed up every 6 hours, then a job scheduler will post a "pull snapshot" job into the job queue 224 at the appropriate 6-hour intervals. Other jobs, such as internal trash collection or updating of incremental backups, are generated according to the DMS cluster's operation separate from the service schedule 222.

The job schedulers 204 preferably are decentralized and execute without a master. The overall job scheduling function for the DMS cluster 112 is executed by the multiple job schedulers 204 running on different DMS nodes. Each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution.

The job engines 206 process the jobs in the job queue 224. When a DMS node is ready for a new job, it pulls a job from the job queue 224, which is then executed by the job engine 206. Preferably, the job engines 206 all have access to the entire job queue 224. Thus, a job scheduler 204j from one node might post a job, which is then pulled from the queue and executed by a job engine 206k from a different node.

In some cases, a specific job is assigned to or has preference for a particular DMS node (or group of nodes) to execute. For example, if a snapshot for a VM is stored in the section of the data store 118 implemented on a particular node 114x, then it may be advantageous for the job engine 206x on that node to pull the next snapshot of the VM if that process includes comparing the two snapshots. As another example, if the previous snapshot is stored redundantly on three different nodes, then the preference may be for any of those three nodes.

The snapshot table 226 and image table 228 are data structures that index the snapshots captured by the DMS cluster 112. In this example, snapshots are decomposed into "images," which are stored in the data store 118. The snapshot table 226 describes which images make up each snapshot. For example, the snapshot of machine x taken at time y can be constructed from the images a,b,c. The image table is an index of images to their location in the data store. For example, image a is stored at location aaa of the data store 118, image b is stored at location bbb, etc. More details of example implementations are provided in FIG. 4 below.

DMS database 116 also stores metadata information for the data in the data store 118. The metadata information may include file names, file sizes, permissions for files, various times such as when the file was created or last modified.

Figure 3:
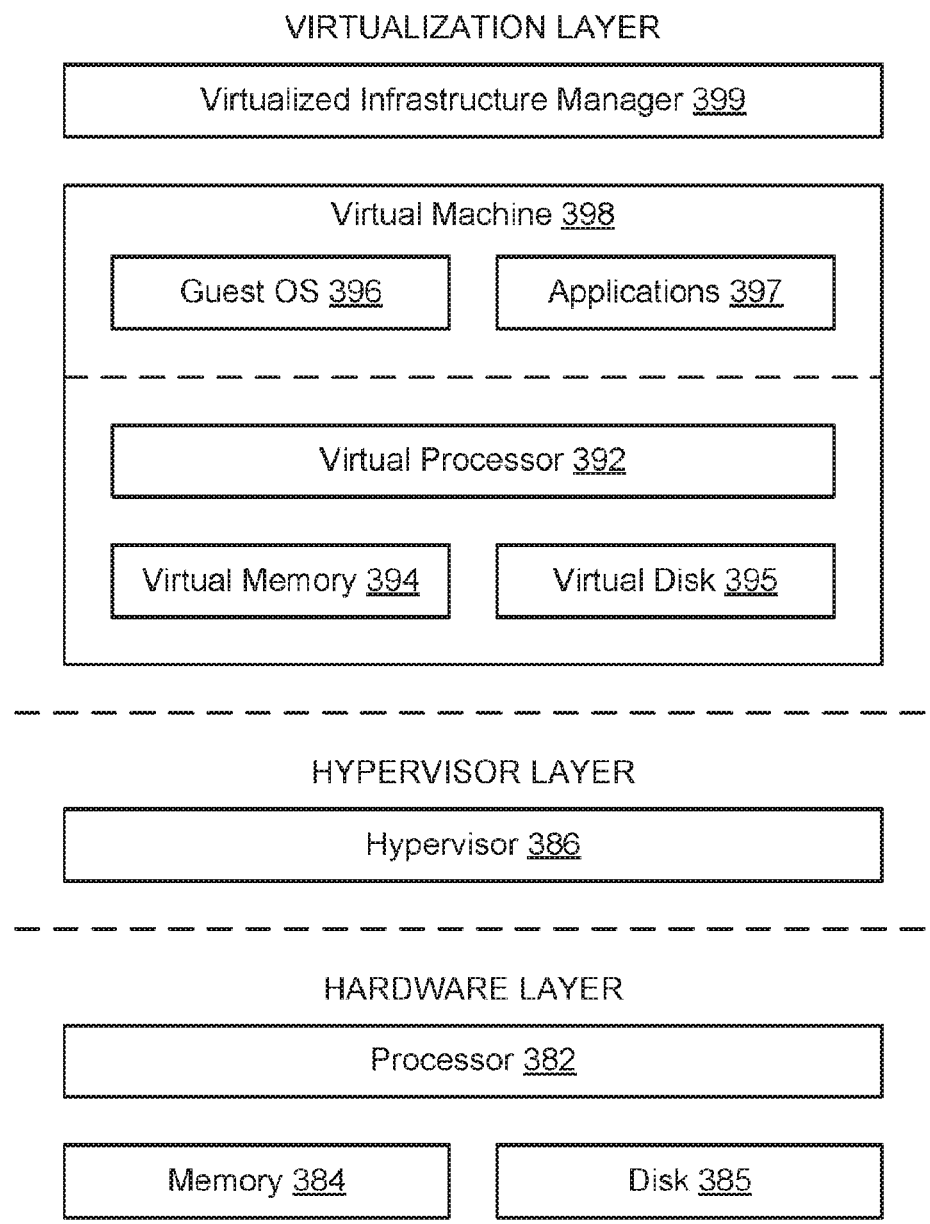
FIG. 3 is a block diagram of a server for a VM platform, according to an example embodiment.

FIG. 3 is a block diagram of a server for a VM platform, according to one embodiment. The server includes hardware-level components and software-level components. The hardware-level components include one or more processors 382, one or more memory 384, and one or more storage devices 385. The software-level components include a hypervisor 386, a virtualized infrastructure manager 399, and one or more virtual machines 398. The hypervisor 386 may be a native hypervisor or a hosted hypervisor. The hypervisor 386 may provide a virtual operating platform for running one or more virtual machines 398. Virtual machine 398 includes a virtual processor 392, a virtual memory 394, and a virtual disk 395. The virtual disk 395 may comprise a file stored within the physical disks 385. In one example, a virtual machine may include multiple virtual disks, with each virtual disk associated with a different file stored on the physical disks 385. Virtual machine 398 may include a guest operating system 396 that runs one or more applications, such as application 397. Different virtual machines may run different operating systems. The virtual machine 398 may load and execute an operating system 396 and applications 397 from the virtual memory 394. The operating system 396 and applications 397 used by the virtual machine 398 may be stored using the virtual disk 395. The virtual machine 398 may be stored as a set of files including (a) a virtual disk file for storing the contents of a virtual disk and (b) a virtual machine configuration file for storing configuration settings for the virtual machine. The configuration settings may include the number of virtual processors 392 (e.g., four virtual CPUs), the size of a virtual memory 394, and the size of a virtual disk 395 (e.g., a 10 GB virtual disk) for the virtual machine 395.

The virtualized infrastructure manager 399 may run on a virtual machine or natively on the server. The virtualized infrastructure manager 399 corresponds to the virtualization module 106 in FIG. 2A and may provide a centralized platform for managing a virtualized infrastructure that includes a plurality of virtual machines. The virtualized infrastructure manager 399 may manage the provisioning of virtual machines running within the virtualized infrastructure and provide an interface to computing devices interacting with the virtualized infrastructure. The virtualized infrastructure manager 399 may perform various virtualized infrastructure related tasks, such as cloning virtual machines, creating new virtual machines, monitoring the state of virtual machines, and facilitating backups of virtual machines.

Figure 4:
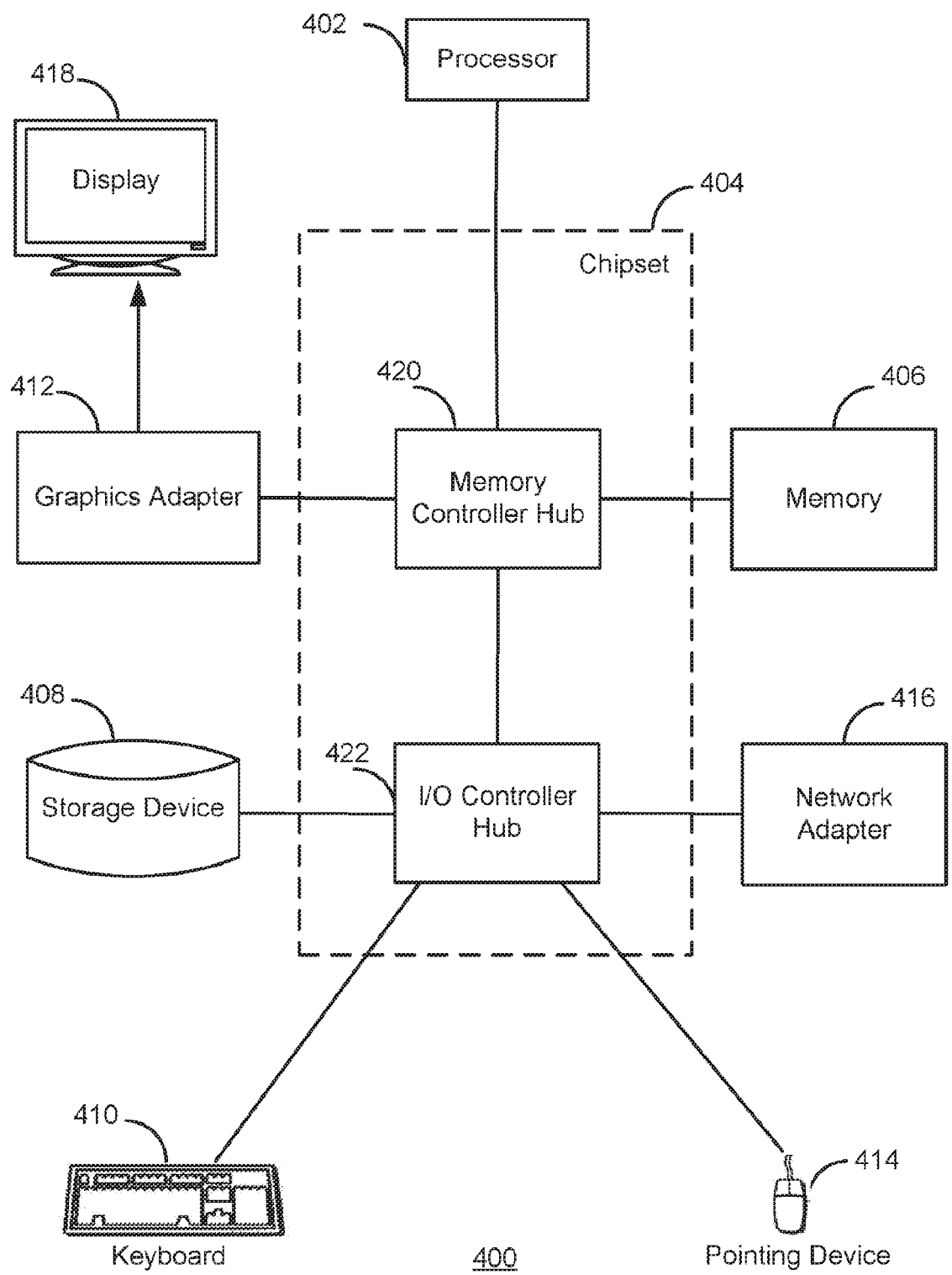
FIG. 4 is a high-level block diagram illustrating an example of a computer system, according to an example embodiment.

FIG. 4 is a high-level block diagram illustrating an example of a computer system 400 for use as one or more of the components shown above, according to one embodiment. Illustrated are at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display device 418 is coupled to the graphics adapter 412. A storage device 408, keyboard 410, pointing device 414, and network adapter 416 are coupled to the I/O controller hub 422. Other embodiments of the computer 400 have different architectures. For example, the memory 406 is directly coupled to the processor 402 in some embodiments.

The storage device 408 includes one or more non-transitory computer-readable storage media such as a hard drive, compact disk read-only memory (CD-ROM), DVD, or a solid-state memory device. The memory 406 holds instructions and data used by the processor 402. The pointing device 414 is used in combination with the keyboard 410 to input data into the computer system 400. The graphics adapter 412 displays images and other information on the display device 418. In some embodiments, the display device 418 includes a touch screen capability for receiving user input and selections. The network adapter 416 couples the computer system 400 to a network. Some embodiments of the computer 400 have different and/or other components than those shown in FIG. 4. For example, the virtual machine 104, the physical machine 108, and/or the DMS nodes 114 in FIG. 2B can be formed of multiple blade servers and lack a display device, keyboard, and other components.

The computer 400 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 408, loaded into the memory 406, and executed by the processor 402.

Figure 5:
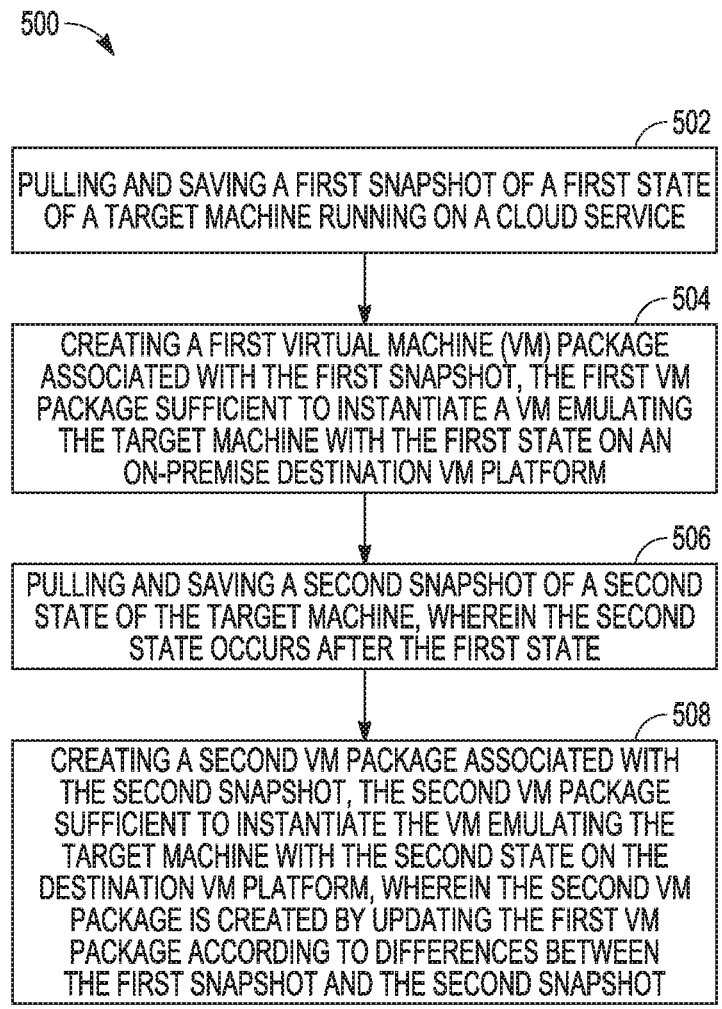
FIG. 5 is a flow chart of example operations in a method, according to an example embodiment.

Some examples of the present disclosure include method embodiments. With reference to FIG. 5, an example method 500 comprises at least the following operations: at 502, pulling and saving a first snapshot of a first state of a target machine running on a cloud service; at 504, creating a first virtual machine (VM) package associated with the first snapshot, the first VM package sufficient to instantiate a VM emulating the target machine with the first state on an on-premise destination VM platform, at 506, pulling and saving a second snapshot of a second state of the target machine, wherein the second state occurs after the first state; and, at 508, creating a second VM package associated with the second snapshot, the second VM package sufficient to instantiate the VM emulating the target machine with the second state on the destination VM platform, wherein the second VM package is created by updating the first VM package according to differences between the first snapshot and the second snapshot.

In some examples, the snap shot is an Amazon Machine Image (AMI) and the cloud service is Amazon Web Services (AWS).

In some examples, the VM package is a Virtual Machine Disk (VMDK) and the on-premise destination VM platform is a VMware platform.

In some examples, first and second VM packages are created for at least two different destination VM platforms.

In some examples, the target machine is a physical machine.

In some examples, the target machine is a virtual machine.

In some examples, pulling and saving the snapshots is performed as part of a backup service for a compute infrastructure.

Some example embodiments include systems as summarized further above, or specifically described herein, that include processors configured to perform one or more of the method operations summarized above or described herein. Some example embodiments also include non-transitory machine-readable media that include instructions for performing one or more of the method operations summarized above or described herein.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A method, comprising:
    pulling and saving a first snapshot of a first state of a target machine running on a cloud service, wherein the first snapshot is usable to instantiate a virtual machine (VM) emulating the target machine with the first state on the cloud service;
    creating a first VM package associated with the first snapshot, the first VM package configured to instantiate a VM emulating the target machine with the first state on a destination VM platform that is different than the cloud service;
    pulling and saving a second snapshot of a second state of the target machine, wherein the second state occurs after the first state, wherein the second snapshot is usable to instantiate a VM emulating the target machine with the second state on the cloud service; and
    creating a second VM package associated with the second snapshot, the second VM package configured to instantiate a VM emulating the target machine with the second state on the destination VM platform, wherein the second VM package is created by updating the first VM package according to differences between the first snapshot and the second snapshot.

2. The method of claim 1, wherein the first and second snapshots are Amazon Machine Images (AMI) and the cloud service is Amazon Web Services (AWS).

3. The method of claim 1, wherein the first and second VM packages are Virtual Machine Disks (VMDK) and the destination VM platform is a VMware platform.

4. The method of claim 1, wherein first and second VM packages are created for at least two different destination VM platforms.

5. The method of claim 1, wherein the target machine is a physical machine.

6. The method of claim 1, wherein the target machine is a virtual machine.

7. The method of claim 1, wherein pulling and saving the first and second snapshots is performed as part of a backup service for a compute infrastructure.

8. A system comprising:
    at least one processor; and
    a memory storing machine-readable instructions that, when executed by the at least one processor, cause the system to perform operations comprising, at least:
        pulling and saving a first snapshot of a first state of a target machine running on a cloud service, wherein the first snapshot is usable to instantiate a virtual machine (VM) emulating the target machine with the first state on the cloud service;
        creating a first VM package associated with the first snapshot, the first VM package configured to instantiate a VM emulating the target machine with the first state on a destination VM platform that is different than the cloud service;
        pulling and saving a second snapshot of a second state of the target machine, wherein the second state occurs after the first state, wherein the second snapshot is usable to instantiate a VM emulating the target machine with the second state on the cloud service; and
        creating a second VM package associated with the second snapshot, the second VM package comprising associated information to instantiate a VM emulating the target machine with the second state on the destination VM platform, wherein the second VM package is created by updating the first VM package according to differences between the first snapshot and the second snapshot.

9. The system of claim 8, wherein the first and second snapshots are Amazon Machine Images (AMI) and the cloud service is Amazon Web Services (AWS).

10. The system of claim 8, wherein the first and second VM packages are Virtual Machine Disks (VMDK) and the destination VM platform is a VMware platform.

11. The system of claim 8, wherein first and second VM packages are created for at least two different destination VM platforms.

12. The system of claim 8, wherein the target machine is a physical machine.

13. The system of claim 8, wherein the target machine is a virtual machine.

14. The system of claim 8, wherein pulling and saving the first and second snapshots is performed as part of a backup service for a compute infrastructure.

15. A non-transitory machine-readable medium including instructions which, when read by a machine, cause the machine to perform operations including, at least:
    pulling and saving a first snapshot of a first state of a target machine running on a cloud service, wherein the first snapshot is usable to instantiate a virtual machine (VM) emulating the target machine with the first state on the cloud service;

creating a first VM package associated with the first snapshot, the first VM package configured to instantiate a VM emulating the target machine with the first state on a destination VM platform that is different than the cloud service;

pulling and saving a second snapshot of a second state of the target machine, wherein the second state occurs after the first state, wherein the second snapshot is usable to instantiate a VM emulating the target machine with the second state on the cloud service; and creating a second VM package associated with the second snapshot, the second VM package comprising associated information to instantiate the VM emulating the target machine with the second state on the destination VM platform, wherein the second VM package is created by updating the first VM package according to differences between the first snapshot and the second snapshot.

16. The medium of claim 15, wherein the first and second snapshots are Amazon Machine Images (AMI) and the cloud service is Amazon Web Services (AWS).

17. The medium of claim 15, wherein the first and second VM packages are Virtual Machine Disks (VMDK) and the destination VM platform is a VMware platform.

18. The medium of claim 15, wherein first and second VM packages are created for at least two different destination VM platforms.

19. The medium of claim 15, wherein the target machine is a physical machine.

20. The medium of claim 15, wherein the target machine is a virtual machine.

\* \* \* \* \*